United States Patent [19]
Umetani et al.

[11] Patent Number: 5,402,463
[45] Date of Patent: Mar. 28, 1995

[54] APPARATUS AND METHOD FOR RADIATION IMAGING

[75] Inventors: Keiji Umetani, Hino; Ken Ueda, Oume; Yoichi Onodera, Hachiouji; Hisatake Yokouchi, Nishitama, all of Japan

[73] Assignee: Hitachi Medical Corporation, Tokyo, Japan

[21] Appl. No.: 109,075

[22] Filed: Aug. 19, 1993

[30] Foreign Application Priority Data

Aug. 24, 1992 [JP] Japan ................................ 4-224062

[51] Int. Cl.[6] ............................................. A61B 6/00
[52] U.S. Cl. ................................. 378/98.7; 378/98.2
[58] Field of Search ..................... 378/98.2, 98.7, 98.8, 378/98

[56] References Cited

U.S. PATENT DOCUMENTS

| 4,375,068 | 2/1983 | McBride | 378/98.2 |
| 5,022,063 | 6/1991 | Yokouchi et al. | 378/98.2 |

Primary Examiner—David P. Porta
Attorney, Agent, or Firm—Antonelli, Terry, Stout & Kraus

[57] ABSTRACT

An X-ray imaging apparatus is constructed with a combination of an X-ray image intensifier, a relay optical system, and a video camera with avalanche multiplication camera tube. The video camera is controlled by an image acquisition circuit, a synchronizing signal generation circuit, and an applying voltage control circuit. The applying voltage control circuit for controlling the voltage to be applied to the video camera with avalanche multiplication camera tube controls the applying voltage on the basis of image data in an image memory so that the gray scale level of a detected visible image is corrected.

15 Claims, 3 Drawing Sheets

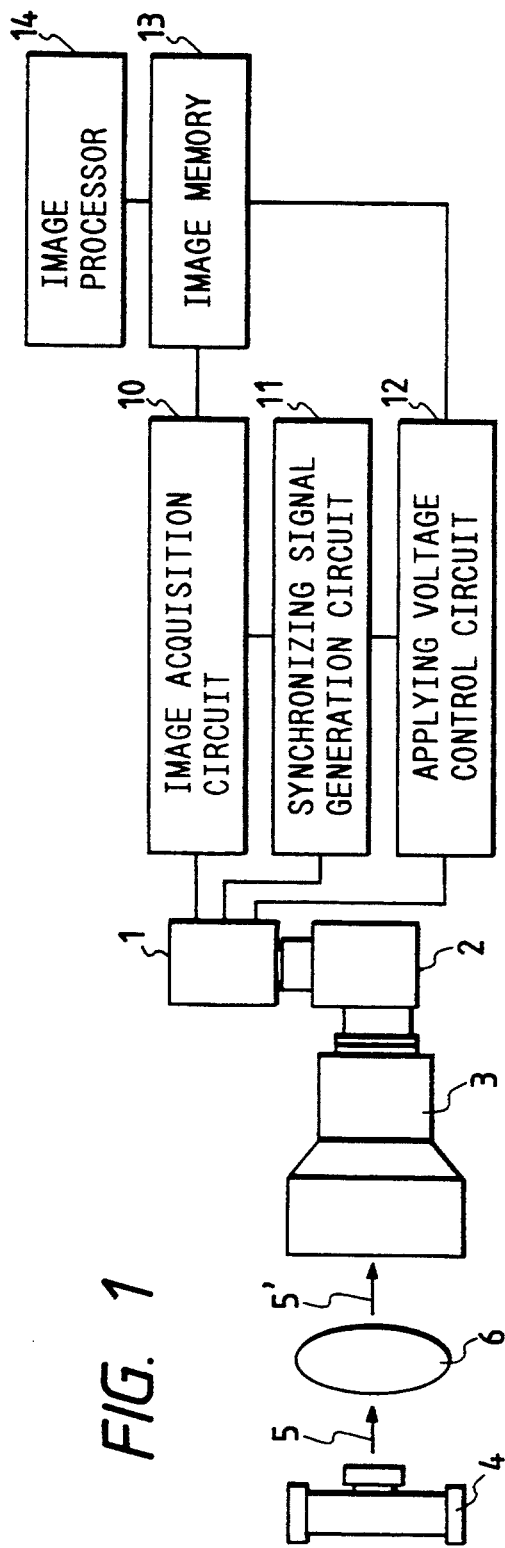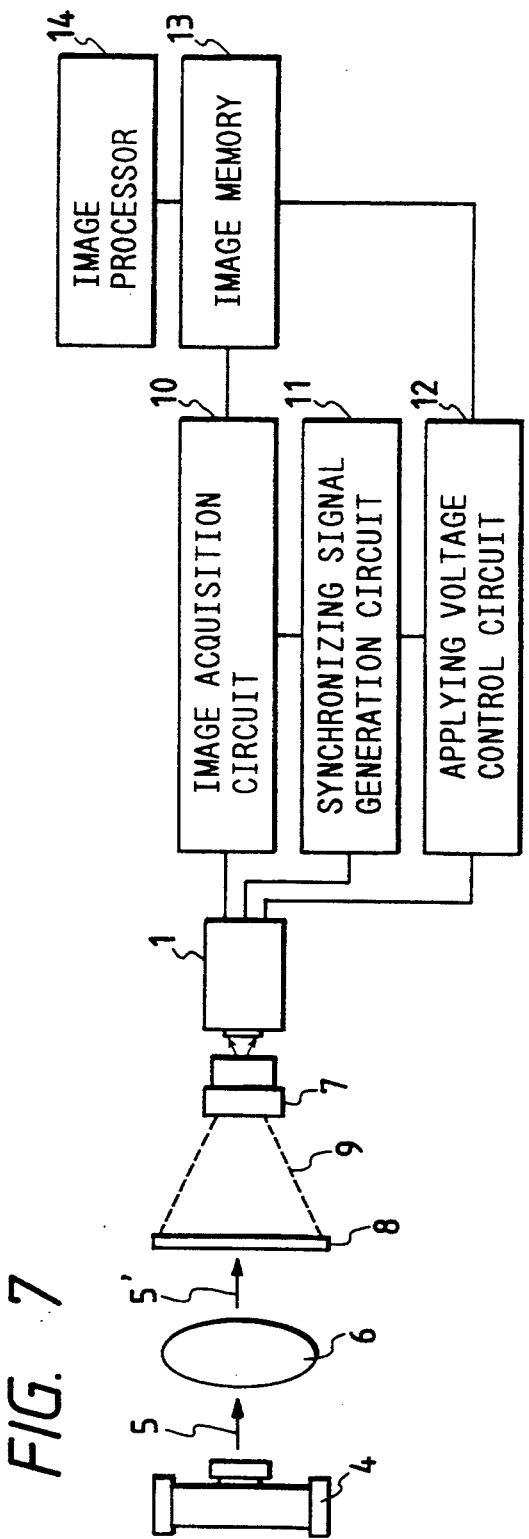

APPARATUS AND METHOD FOR RADIATION IMAGING

BACKGROUND OF THE INVENTION

The present invention relates to a radiation imaging apparatus such as a radiation video camera system for converting a radiation projection image of an object to a visible image and detecting the visible image with a video camera. The present invention relates to a radiation imaging method using such an apparatus. The present invention relates to, for example, a radiation image diagnosis apparatus for medical use.

According to a conventional radiation imaging apparatus, particularly an X-ray video camera system, a camera tube and solid-state image sensor which are generally used for broadcasting are used and an X-ray image intensifier or fluorescent screen is used as a means to convert X rays to a visible image. As a high sensitivity X-ray video camera system, there is an X-ray video camera system using a secondary electron multiplying type camera tube such as a silicon intensifier target (SIT) tube as a high sensitivity camera tube. As a high sensitivity device, there is a solid-state image sensor with a visible light image intensifier. According to a conventional normal video camera, light irradiated to the camera tube is converted to electric charges in the number in proportion to the number of light photons in the photoelectric conversion layer and the electric charges in the number in proportion to the number of irradiated light photons reach the electrode and are converted to a signal current. Therefore, when an image to be detected has a wide-gray scale level distribution, the detected image also has a wide gray scale level distribution. As a result, when the entire detected image is displayed after imaging, the contrast of the specific region of interest is low. To obtain an X-ray image in which the gray scale level of the background is uniform as much as possible, an X-ray attenuation filter in a suitable shape is used conventionally between an object and the X-ray source. The portion having high X-ray transmissivity in the object has a high gray scale level in the detected image and the portion having low X-ray transmissivity has a low gray scale level in the detected image. To correct it, the X-ray attenuation filter at the position corresponding to the portion having high X-ray transmissivity in the object is made thick so as to absorb a large amount of X-rays and to reduce the X-ray radiation exposure of the object. And, the X-ray attenuation filter at the position corresponding to the portion having low X-ray transmissivity in the object is made thin so as to absorb a small amount of X rays and to increase the X-ray radiation exposure of the object. By using such X-ray attenuation filters, the X-ray transmissivity distribution in each region of the object is corrected and an X-ray image in which the gray scale level of the background is uniform as much as possible is obtained as a detected image.

In addition to the above, as a method for detecting an image in which the gray scale level of the background is almost uniform, there is a method for changing the amplification factor of the amplifier circuit for video camera output signals in correspondence with the electron beam scanning position of the camera tube according to a synchronizing signal of the video camera. Namely, when reading out the portion of an input image with high signal intensity by electron beam scanning of the camera tube, the amplification factor of the amplifier circuit for video camera output signals is decreased. When reading out the portion of an input image with low signal intensity, the amplification factor of the amplifier circuit is increased. By detecting an image like this by changing the amplification factor of the amplifier circuit at each electron beam scanning position of the camera tube, an image is detected by converting the gray scale level distribution of the background of the detected image to an almost uniform gray scale level distribution.

Apparatuses related to this type of apparatus are indicated in, for example, Japanese Patent Application Laid-Open Nos. 64-17631, 1-300684, 1-91837 and 2-41142, and U.S. Pat. No. 5,023,896 which corresponds to Japanese Patent Application Laid-Open No. 1-300684.

In the conventional camera tube and solid-state image sensor which are used generally for broadcasting, the sensitivity of the imaging device itself is low. In the X-ray image intensifier or fluorescent screen, the brightness of an output visible image in imaging at a low X-ray dose is low. In an X-ray video camera system using a secondary electron multiplying type camera tube such as an SIT tube as a high sensitivity camera tube, the resolution is low. In a solid-state image sensor with a visible light image intensifier, the resolution is also low.

In addition to the above problems, in the conventional normal video camera, when an image to be detected has a wide gray scale level distribution, the detected image also has a wide gray scale level distribution and as a result, when the entire detected image is displayed after imaging, the contrast of the specific region of interest is low. When the displaying brightness level of the display device is adjusted so that only the region of interest is enhanced so as to make it easy to see, the gray scale level distribution of the entire image is out of the displayable range of the display device and the image cannot be displayed at a suitable brightness level. According to the conventional method using an X-ray attenuation filter in a suitable shape between an object and the X-ray source so as to solve the above problem and to obtain an X-ray image which is uniform as much as possible, it is necessary to mount an X-ray. attenuation filter for each object and the throughput is not high. Furthermore, according to the conventional method for changing the amplification factor of the amplifier circuit for video camera output signals at each electron beam scanning position of the camera tube. according to a synchronizing signal of the video camera, the amplification factor of the amplifier circuit is changed in correspondence with the electron beam scanning position of the camera tube.

Therefore, the image signal intensity is changed, and the circuit noise component is simultaneously amplified in proportion to the amplification of the signal component, and a noise distribution is generated in the detected image.

SUMMARY OF THE INVENTION

An object of the present invention is to provide an apparatus and method for allowing detecting a radiation image of high image quality in which the gray scale level in the region other than the region of interest, that is, of the background is almost uniform.

To accomplish the above object, a radiation imaging apparatus is constructed with a video camera with avalanche multiplication camera tube for detecting a visible image which is converted from a radiation image. This video camera is controlled by an image acquisition circuit, synchronizing signal generation circuit, and applying voltage control circuit. Image data in the image memory is used as an applying voltage image, and an applying voltage control signal for controlling the target voltage of the camera tube is obtained, and the target voltage of the camera tube is controlled and applied by the applying voltage control circuit, and a visible image is detected by correcting so as to make the gray scale level distribution of the background of the detected image almost uniform. By using the video camera with avalanche multiplication camera tube, as to the visible image which is obtained by visualizing a radiation image to be detected, the amplification factor in the image can be changed, so that a visible image with high image quality in which the gray scale level of the background is almost uniform can be detected.

BRIEF DESCRIPTION OF THE DRAWINGS

FIG. 1 is a block diagram of an X-ray imaging apparatus of the first embodiment of the present invention.

FIG. 7 is a block diagram of an X-ray imaging apparatus of the second embodiment of the present invention.

DETAILED DESCRIPTION OF THE INVENTION

Figure 2:
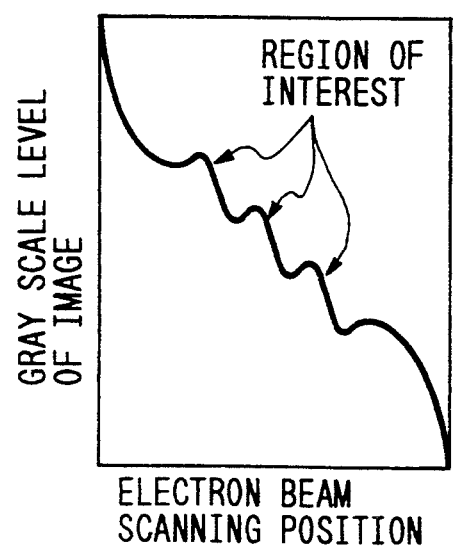
FIG. 2 is a graph showing the gray scale level of one scanning line of the detected image in the first embodiment of the present invention.

A radiation imaging apparatus for irradiating radiation to an object to be inspected and detecting a visualized image of the object to be inspected (visible image) uses a video camera using a camera tube having a function for practically amplifying only a signal representing the gray scale level of this visualized image of the object to be inspected. The camera tube has a photoelectric conversion layer having a function for converting light irradiated to the layer to electric charges and avalanche-multiplying those electric charges. To adjust the output signal level of the video camera, the avalanche multiplication factor is changed by changing the target voltage of the camera tube to be applied to the photoelectric conversion layer. The target voltage of the camera tube is changed according to a synchronizing signal of the video camera, and the avalanche multiplication factor is changed in correspondence with the electron beam scanning position of the camera tube, and the visualized image of the object to be inspected is detected so that the gray scale level of the visualized image is converted to an almost uniform gray scale level distribution.

This visualized image of the object to be inspected is recorded as an image signal beforehand and an applying voltage control signal is generated on the basis of the recorded image signal. The target voltage of the camera tube is determined on the basis of this control signal. In addition, an applying voltage control signal is determined on the basis of an image signal of a visualized image of an object to be inspected which is detected by the video camera or an image signal which is obtained by smoothing the above image signal, or on the basis of a reverse image signal in which the high or low state of the image signal level of a visualized image of an object to be inspected which is detected by the video camera is reversed, or on the basis of an image signal which is obtained by executing the spatial frequency filtering to a reverse image signal in which the high or low state of the image signal level of a visualized image of an object to be inspected which is detected by the video camera is reversed, or on the basis of an image signal which is obtained by executing the smoothing or the spatial frequency filtering for enhancing the low frequency component to a reverse image signal in which the high or low state of the image signal level of a visualized image of an object to be inspected which is detected by the video camera is reversed, or on the basis of an image which is obtained by executing the spatial frequency filtering to a reverse image signal in which the high or low state of the image signal level of a visualized image of an object to be inspected which is detected by the video camera is reversed by using a frequency filter for enhancing the frequency band including the spatial frequency of the gray scale level distribution of image in other than the region of interest, or on the basis of an image signal of a visualized image of an object to be inspected which is obtained by irradiating a radiation dose lower than a predetermined radiation dose before detecting a visualized image of the object to be inspected by irradiating the predetermined radiation dose to obtain an almost uniform gray scale level distribution, or on the basis of an image signal which is obtained by adding or adding and averaging image signals of a plurality of images of an object to be inspected which are visualized by a plurality of times by irradiating a radiation dose lower than a predetermined radiation dose before detecting a visualized image of the object to be inspected by irradiating the predetermined radiation dose to obtain an almost uniform gray scale level distribution.

Furthermore, in one imaging of an image of an object to be inspected for converting the gray scale level distribution of the background of a visualized image of the object to be inspected to an almost uniform gray scale level distribution, before detecting a visualized image of the object to be inspected by irradiating the predetermined radiation dose to obtain an almost uniform gray scale level distribution, an applying voltage control signal is determined on the basis of an image signal of a visualized image of the object to be inspected which is obtained by irradiating a radiation dose lower than a predetermined radiation dose and the image of the object to be inspected which has an almost uniform gray scale level distribution of the background is detected by a plurality of times. Or, in one imaging of an image of an object to be inspected for converting the gray scale level distribution of the background of a visualized image of the object to be inspected to an almost uniform gray scale level distribution, before detecting a visualized image of the object to be inspected by irradiating the predetermined radiation dose to obtain an almost uniform gray scale level distribution, image signals of a plurality of images of the object to be inspected which are visualized by a plurality of times are obtained by irradiating a radiation dose lower than a predetermined radiation dose, and an applying voltage control signal is determined on the basis of an image signal which is obtained by adding or adding and averaging these image signals of the plurality of images, and the image of the object to be inspected which has an almost uniform gray scale level distribution of the background is detected by a plurality of times.

Visualized images are formed on the output fluorescent screen of the X-ray image intensifier or on the fluorescent screen.

In a conventional video camera, light irradiated to the camera tube is converted to electric charges in the number in proportion to the number of light photons in the photoelectric conversion layer and these electric charges reach the electrode and are converted to a signal current. On the other hand, in the video camera with avalanche multiplication camera tube, light irradiated to the camera tube is converted to electric charges in the number in proportion to the number of light photons in the photoelectric conversion layer and these electric charges collide with atoms in the photoelectric conversion layer before reaching the electrode and generate new electric charges one after another, so that the amount of electric charges increases.

By avalanche multiplication, the number of electric charges is increased to about 1000 times, and a signal current about 1000 times as high as that of a conventional video camera is obtained, and high sensitivity imaging is made possible. Therefore, in an apparatus for detecting a visible image which is obtained by visualizing a radiation image, high sensitivity imaging is made possible at a low radiation dose and imaging using a radiation exposure which is substantially reduced is made possible.

Furthermore, according to the avalanche multiplication camera tube, signal charges are increased by avalanche multiplication but the noise component is increased little. Therefore, an imaging apparatus in which not only the camera tube is highly sensitive but also the signal-to-noise ratio is extremely good can be constructed.

The multiplication of electric charges by the avalanche multiplication can be controlled by the target voltage of the camera tube to be applied to the photoelectric conversion layer of the camera tube and a most suitable output signal current according to the number of incident light photons to the camera tube can be obtained. Therefore, by changing the multiplication factor at each electron beam scanning position of the camera tube, a visible image can be detected so as to correct the wide gray scale level distribution of the background of the visible image and a radiation image for medical use with high image quality having an almost uniform gray scale level of the background in which the gray scale level distribution such as radiation image shading is corrected can be detected.

DETAILED DESCRIPTION OF THE PREFERRED EMBODIMENTS

FIG. 1 is a block diagram of an X-ray imaging apparatus of the first embodiment of the present invention. A video camera with avalanche multiplication camera tube 1 of this embodiment detects output images of an X-ray image intensifier 3 by a relay optical system 2. In X-ray imaging, the X-ray image intensifier 3 detects transmitted X-rays 5' after irradiated X-rays 5 generated from an X-ray tube 4 transmit through an object 6 and converts them to a visible image. The visible image is detected by the video camera with avalanche multiplication camera tube 1 via the relay optical system 2.

The video camera with avalanche multiplication camera tube detects a visible image which is controlled by an image acquisition circuit 10, a synchronizing signal generation circuit 11, an applying voltage control circuit 12, an image memory 13, and an image processor 14. The synchronizing signal generation circuit 11 generates a synchronizing signal for driving the video camera with avalanche multiplication camera tube 1. The image acquisition circuit 10 receives an analog signal which is an output signal of a camera 1 according to the synchronizing signal from the synchronizing signal generation circuit 11 and converts the analog signal to a digital signal. The image signal which is converted to the digital signal by the image acquisition circuit 10 according to the synchronizing signal is recorded in the image memory 13 as a digital signal image. The image memory 13 can record and hold a plurality of images and the images stored in the image memory are subjected to various types of image processing by the image processor 14. The applying voltage control circuit 12 controls the voltage to be applied to a photoelectric conversion layer and controls the avalanche multiplication factor of the camera tube of the video camera 1. Particularly, the applying voltage control circuit 12 has a function for adjusting the voltage to be applied to the photoelectric conversion layer in correspondence with the electron beam scanning position of the camera tube according to the synchronizing signal of the synchronizing signal generation circuit 11.

The minimum value of an output signal of the video camera 1 is determined by the noise level of the video camera and the maximum value of an output signal is determined by the saturation signal level of the camera tube. It is necessary to set a camera output signal between the minimum and maximum values. According to this embodiment, the voltage to be applied to the photoelectric conversion layer of the camera tube (target voltage of the camera tube) is changed by the applying voltage control circuit 12 so as to change the avalanche multiplication factor and the camera output signal is adjusted. By doing this, the camera output signal can be amplified close to the maximum value of the output signal even in imaging at a low X-ray dose, so that high sensitivity imaging can be realized. In the conventional imaging at a small X-ray dose, the camera output signal is amplified by a signal amplifier. Therefore, the noise component is also amplified in proportion to the amplification of the signal component and the image quality of the detected image is not good. According to this embodiment, the video camera with avalanche multiplication camera tube 1 is used, and the camera tube itself can amplify only the signal component substantially, and a high-quality image with a small noise component can be obtained.

In a visible image which is converted from an X-ray image by the X-ray image intensifier 3, there is a wide gray scale level distribution due to the X-ray intensity distribution generated from the X-ray tube 4, the transmitted X-ray distribution in each region in the imaging field of the object 6, and the sensitivity distribution related to the position of the X-ray image intensifier 3. Overlaid on this wide gray scale level distribution in the visible image, a minute structure of region of interest which is necessary for medical diagnosis exists. Therefore, the aforementioned wide gray scale level distribution is a factor for reducing the power of diagnosis in the medical diagnosis. If the gray scale level distribution in other than the region of interest which is necessary for medical diagnosis, that is, the gray scale level distribution of the background is corrected so as to make the gray scale level of the background almost uniform, the power of diagnosis of a detected X-ray image will be improved extraordinarily.

Next, in the structure of this embodiment, a method for correcting the gray scale level distribution in other than the region of interest and making the gray scale level in the region other than the region of interest in an image almost uniform will be described.

According to this embodiment, a corrected image in which the gray scale level distribution is corrected is obtained.

Using uncorrected image data which is stored in the image memory 13 beforehand and in which the gray scale level distribution is not corrected, the applying voltage control circuit 12 changes the voltage to be applied to the photoelectric conversion layer for imaging in synchronization with the synchronizing signal for electron beam scanning, and consequently the avalanche multiplication factor is changed in correspondence with the electron beam scanning position, and a corrected image which is corrected so that the gray scale level distribution is made almost uniform is obtained. For example, when the electron beam of the camera tube during imaging is to scan the position on the photoelectric conversion layer of the camera tube corresponding to a pixel with a high image signal level in an uncorrected image in the image memory, the applying voltage is lowered and adjusted so that the image signal level of the detected image at the corresponding position will not be increased. Inversely when the electron beam of the camera tube during imaging is to scan the position on the photoelectric conversion layer of the camera tube corresponding to a pixel with a low image signal level in an uncorrected image in the image memory, the applying voltage is increased and adjusted so that the image signal level of the detected image at the corresponding position will not be lowered. For example, when an uncorrected image in which the gray scale level is reversed is used as an applying voltage control image, a corrected image is detected as an image in which the gray scale level of the entire image is made uniform.

Figure 3:
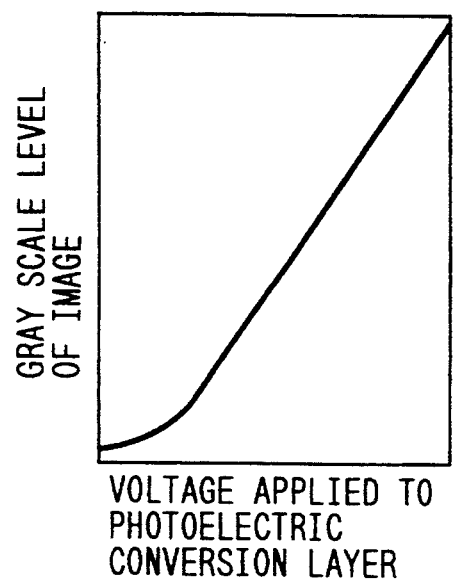
FIG. 3 is a graph showing the relationship between the voltage applied to a photoelectric conversion layer of a camera tube and the gray scale level of image when light with fixed intensity is irradiated in the first embodiment of the present invention.
Figure 4:
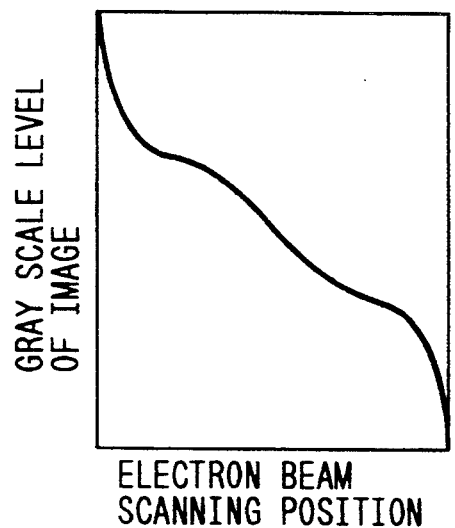
FIG. 4 is a drawing showing the gray scale level of one scanning line of image equivalent to the background of the image shown in FIG. 2.
Figure 5:
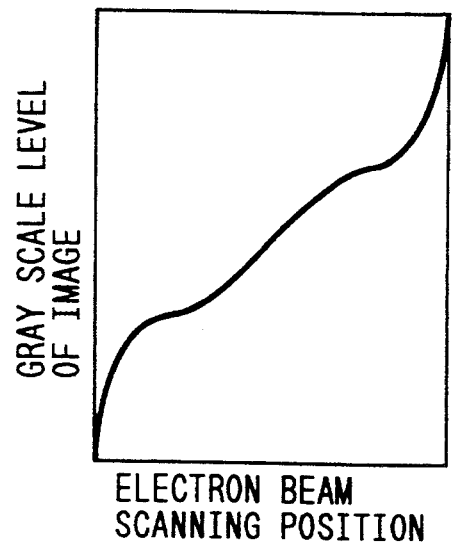
FIG. 5 is a drawing showing the gray scale level of one scanning line of the applying voltage control image in the first embodiment of the present invention.
Figure 6:
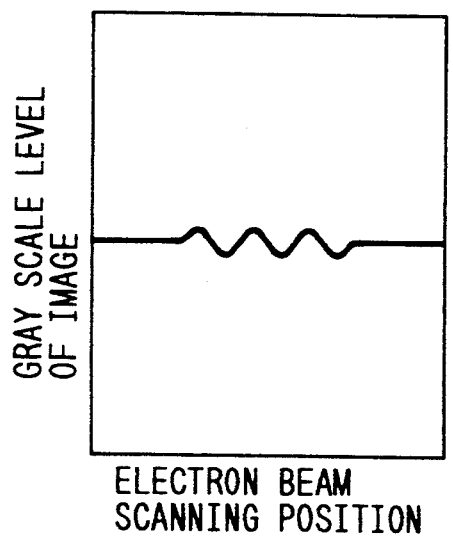
FIG. 6 is a drawing showing the gray scale level of one scanning line of the image having a unified gray scale level of the background which is detected by using the applying voltage control image in the first embodiment of the present invention.

Next, details of the actual operation of the apparatus of this embodiment will be explained in time series with reference to FIGS. 2 to 6. Each of FIGS. 2 and 6 shows the gray scale level of one scanning line (one line) of a detected image, and FIG. 4 shows the gray scale level of one scanning line of a processed image, and FIG. 5 shows the gray scale level of one scanning line of an applying voltage control image. In FIGS. 2 to 6, the electron beam scanning position in the horizontal axis shows the position on one line of an image in the image memory corresponding to the electron beam scanning position on one scanning line.

(1) Detection of an uncorrected image: The voltage to be applied to the photoelectric conversion layer of the camera tube is kept constant and an image which is the same as an image by a conventional apparatus in which the gray scale level distribution of image is not corrected is detected and recorded in the image memory. On the basis of this image, a corrected image in which the gray scale level of the background is made uniform is detected. By this imaging method, as shown in FIG. 2 for example, an image in which the structure of the region of interest is overlaid on the wide gray scale level distribution of the background is obtained.

(2) Determination of unification correction value of parameter: Firstly, an applying voltage—output signal intensity function representing the relationship between the change in avalanche multiplication factor due to adjustment of the applying voltage and the change in output signal intensity is measured. FIG. 3 shows an example of an applying voltage—output signal intensity function representing the relationship between the voltage to be applied to the photoelectric conversion layer and the gray scale level of an image signal which is an output signal of the video camera when light with a fixed intensity is irradiated. The range of the gray scale level distribution is obtained from the image signal level of the detected uncorrected image. Next, the range of the voltage to be applied to the photoelectric conversion layer of the camera tube which is necessary to realize unification of the gray scale level of the background of an image is determined. Furthermore, the applying voltage width for the gray scale level width of an image to be corrected is determined from the applying voltage—output signal intensity function.

(3) Generation of an applying voltage control image: Image processing, for example, the smoothing is taken for an uncorrected image in the image memory so as to generate an image having the gray scale level distribution of the background of the region of interest. Next, an applying voltage control image for detecting a corrected image is generated by reversing the high and low state of the gray scale level of the image having the gray scale level distribution of the background of the region of interest into the low and high state of the gray scale level of the image, and stored in the image memory. FIG. 4 shows one scanning line of the gray scale level distribution in the background of the region of interest which is obtained by processing the uncorrected image shown in FIG. 2 as mentioned above. In addition, FIG. 5 shows one scanning line of the applying voltage control image which is obtained by reversing the high or low state of the gray scale level shown in FIG. 4.

(4) Detecting a corrected image: Imaging is executed and an image which is formed as a charge distribution on the photoelectric conversion layer is read out by an electron beam of the camera tube according to a synchronizing signal generated by the synchronizing signal generation circuit 11. In synchronization with it at this time, the applying voltage control circuit 12 reads out the applying voltage control image in the image memory which corresponds to the electron beam scanning position. The gray scale level of this applying voltage control image is converted to an applying voltage on the basis of the applying voltage output signal intensity function and an applying voltage control signal is generated. Based on this, a controlled voltage is applied to the photoelectric conversion layer in synchronization with electron beam scanning. By doing this, an image having an almost uniform gray scale level distribution of the background can be detected. FIG. 6 shows one scanning line of the image having the unified gray scale level of the background which is detected using the applying voltage control image shown in FIG. 5. As a result, only the region of interest shown in the uncorrected image in FIG. 2 is selectively distinguished from the background as shown in FIG. 6 and imaged.

According to this embodiment, this reverse image is not used simply as an applying voltage control image for an uncorrected image in the image memory when correcting the gray scale level distribution but an image which is obtained by applying the spatial frequency filtering to the reverse image is used as a control image. By doing this, an X-ray image with high power of diagnosis in which only the structure of the region of interest for medical diagnosis is enhanced can be detected. As spatial frequency image processing, processing using a frequency filter for enhancing the frequency band including gray scale level distribution spatial frequencies other than the region of interest is performed for the reverse image. In addition, image smoothing or spatial frequency filtering for enhancing the low-frequency component is performed for the reverse image.

As a method for detecting an uncorrected image, prior to the main imaging for detecting a corrected image, an image is detected at a lower X-ray dose than that of the imaging of a corrected image so as to reduce the radiation exposure. When the main imaging for detecting a corrected image is continuous imaging, uncorrected images are also detected continuously, and an addition image or addition and average image is formed from these continuous images, and the main imaging for detecting corrected images is performed continuously using the image as an applying voltage control image for correcting the gray scale level distribution. Or, an uncorrected image is detected each time, and then the main imaging for detecting a corrected image is performed using it as an applying voltage control image for gray scale level distribution correction, and this processing is repeated successively to perform continuous imaging.

FIG. 7 is a block diagram of an X-ray imaging apparatus of the second embodiment of the present invention. According to this embodiment, to convert X-rays to a visible image, a fluorescent screen or an intensifying screen 8 is used. An image by fluorescence 9 is focused on the video camera with avalanche multiplication camera tube 1 by a focusing optical system 7. According to this embodiment, an imaging apparatus having a very simple structure using the fluorescent screen or intensifying screen 8 can be offered at a low price.

According to the apparatus of this embodiment, a zooming lens is used as a focusing optical system 7. The field of a visible image on the fluorescent screen or intensifying screen 8 which is focused by the video camera with avalanche multiplication camera tube 1 can be changed by the zooming lens. Therefore, the size of object imaging region can be selected optionally and furthermore a narrow region can be imaged at a high spatial resolution.

In the above description, examples of detecting X-ray images for medical diagnosis are used. However, the imaging method may be applied to an animal or living thing as an object or to non-destructive inspection with an artifact. Furthermore, it is needless to say that not only X-ray images but also images which are visualized by ionizing radiations (alpha rays, beta rays, gamma rays, neutron radiation) containing various corpuscular rays can be detected. For example, when the radiation transmissivity of an object in the non-destructive inspection is equal to or less than that of a human body, the apparatus of this embodiment can be used as it is. When the radiation transmissivity of the object is larger than that of the human body, in the apparatus shown in FIGS. 1 or 7, by sufficiently increasing the thickness of X-ray absorbing fluorescent layer of the X-ray image intensifier 3, fluorescent screen, or intensifying screen 8, a structure having a high absorption rate of X-rays or gamma rays is generated. By increasing the tube voltage of the X-ray tube 4, high-energy X-rays are irradiated or a radioactive isotope is used as a gamma ray source. By doing this, the apparatus of this embodiment can be used as it is. In addition, since also images by various corpuscular rays, alpha rays, or beta rays can be detected by the X-ray image intensifier, fluorescent screen, or intensifying screen, the apparatus of this embodiment can be used for imaging. Images by neutron radiation cannot be detected directly by the apparatus of this embodiment. However, by using a reaction that neutron radiation is converted to charged particles, X-rays, or gamma rays, those images can be detected. For example, neutron radiation is absorbed by boron atoms and converted to corpuscular rays of lithium and helium atoms. Therefore, when boron atoms are contained in the fluorescent substance of the X-ray image intensifier, fluorescent screen, or intensifying screen, neutron radiation is converted to corpuscular rays. The corpuscular rays are detected by the fluorescent substance and as a result, images by neutron radiation can be detected. By doing this, not only X-ray images but also images which are visualized by ionizing radiations containing various corpuscular rays can be detected.

According to the present invention, even in imaging at a low X-ray dose, high sensitivity imaging in which an image signal is amplified close to the maximum value of the output signal of the video camera is possible. Particularly in imaging for medical diagnosis, an image in which the wide gray scale level distribution of the background which reduces the power of diagnosis in the image is corrected and the gray scale level of the background is made almost uniform can be detected. Therefore, an image with high power of diagnosis in which the minute structure of region of interest which is necessary for medical diagnosis is enhanced can be detected. An imaging apparatus with a very simple structure which uses a fluorescent screen or intensifying screen for converting X rays to a visible image and in which a fluorescent image is focused on the video camera with avalanche multiplication camera tube by the focusing optical system can be offered at a low price. Since a zooming lens is used as a focusing optical system, the size of object imaging region can be selected optionally and a narrow region can be imaged at a high spatial resolution.

What is claimed is:

1. A radiation imaging apparatus including means to irradiate radiation to an object to be inspected, means to detect the radiation transmitted through the object to be inspected and convert it to a visible image, and a video camera for detecting said visible image,
   wherein said video camera includes a camera tube having a function for amplifying substantially only a signal representing the gray scale level of a visible image.

2. A radiation imaging apparatus according to claim 1, wherein said camera tube includes a photoelectric conversion layer having a function for converting incident light to electric charges and avalanche-multiplying said electric charges.

3. A radiation imaging apparatus according to claim 1, wherein said conversion means is an X-ray image intensifier.

4. A radiation imaging apparatus according to claim 1, wherein said conversion means is a fluorescent screen.

5. A radiation imaging method using a radiation imaging apparatus including means to irradiate radiation to an object to be inspected, means to convert a radiation projection image of the object to be inspected to a visible image, and a video camera which includes a camera tube having a photoelectric conversion layer for converting incident light to electric charges and avalanche-multiplying these electric charges and detects the converted visible image, said method comprising the steps of:
changing the avalanche multiplication factor by controlling the target voltage of the camera tube to be applied to said photoelectric conversion layer; and
adjusting the output signal level of said video camera by changing the avalanche multiplication factor;
wherein said target voltage of the camera tube is changed according to a synchronizing signal of the video camera, and the avalanche multiplication factor is changed in correspondence with the electron beam scanning position of the camera tube, and a visible image is detected by converting the gray scale level thereof.

6. A radiation imaging method using a radiation imaging apparatus including means to irradiate radiation to an object to be inspected, means to convert a radiation projection image of the object to be inspected to a visible image, and a video camera which includes a camera tube having a photoelectric conversion layer for converting incident light to electric charges and avalanche-multiplying these electric charges and detects the converted visible image, said method comprising the steps of:
changing the avalanche multiplication factor by controlling the target voltage of the camera tube to be applied to said photoelectric conversion layer; and
adjusting the output signal level of said video camera by changing the avalanche multiplication factor;
wherein said target voltage of the camera tube is changed according to a synchronizing signal of the video camera, and the avalanche multiplication factor is changed in correspondence with the electron beam scanning position of the camera tube, and a visible image is detected by converting the gray scale level thereof; and
wherein said visible image is recorded as an image signal beforehand, and the target voltage of the camera tube of the video camera is determined by applying voltage control signal based on said image signal, and the gray scale level of the visible image is converted.

7. A radiation imaging method according to claim 6, wherein an applying voltage control signal is determined on the basis of the image signal of the visible image which is detected by said video camera or an image signal which is obtained by smoothing said image signal.

8. A radiation imaging method according to claim 6, wherein an applying voltage control signal is determined on the basis of a reverse image signal which is generated by reversing the high or low state of the image signal level of the visible image having been detected by said video camera.

9. A radiation imaging method according to claim 6, wherein an applying voltage control signal is determined on the basis of an image signal which is obtained by executing spatial frequency filtering to a reverse image signal which is generated by reversing the high or low state of the image signal level of the visible image having been detected by said video camera.

10. A radiation imaging method according to claim 6, wherein an applying voltage control signal is determined on the basis of an image signal which is obtained by executing smoothing or spatial frequency filtering for enhancing the low frequency component to a reverse image signal which is generated by reversing the high or low state of the image signal level of the visible image having been detected by said video camera.

11. A radiation imaging method according to claim 6, wherein an applying voltage control signal is determined on the basis of an image which is obtained by executing spatial frequency filtering to a reverse image signal which is generated by reversing the high or low state of the image signal level of the visible image having been detected by said video camera, by using a frequency filter for enhancing the frequency band including the spatial frequency of the gray scale level in the image region other than the region of interest.

12. A radiation imaging method according to claim 6, wherein said applying voltage control signal is determined on the basis of an image signal of a visible image which is obtained by irradiating a radiation dose lower than a predetermined radiation dose before imaging by converting the gray scale level of a visible image which is obtained by irradiating said predetermined radiation dose.

13. A radiation imaging method according to claim 6, wherein said applying voltage control signal is determined on the basis of an image signal which is obtained by adding or adding and averaging image signals of a plurality of images of an object to be inspected which are visualized by a plurality of times by irradiating a radiation dose lower than a predetermined radiation dose before imaging by converting the gray scale level of a visible image which is obtained by irradiating said predetermined radiation dose.

14. A radiation imaging method according to claim 6, wherein an applying voltage control signal is determined on the basis of an image signal of a visible image which is obtained by irradiating a radiation dose lower than a predetermined radiation dose before imaging by converting the gray scale level of a visible image which is obtained by irradiating said predetermined radiation dose for detecting an object to be inspected so as to convert the gray scale level of said visible image and the visible image which is obtained by irradiating the predetermined radiation dose is detected by a plurality of times.

15. A radiation imaging method according to claim 6, wherein an applying voltage control signal is determined on the basis of an image signal which is obtained by adding or adding and averaging image signals of a plurality of images of an object to be inspected which are visualized by a plurality of times by irradiating a radiation dose lower than a predetermined radiation dose before imaging by converting the gray scale level of a visible image which is obtained by irradiating said predetermined radiation dose for detecting an object to be inspected so as to convert the gray scale level of said visible image and the visible image which is obtained by irradiating the predetermined radiation dose is detected by a plurality of times.

* * * * *